(12) United States Patent
Wunderlich et al.

(10) Patent No.: US 9,864,362 B2
(45) Date of Patent: Jan. 9, 2018

(54) METHOD FOR SETTING AND/OR MONITORING OPERATING PARAMETERS OF A WORKPIECE PROCESSING MACHINE

(71) Applicant: pro-micron GmbH & Co. KG, Kaufbeuren (DE)

(72) Inventors: Rainer Wunderlich, Kaufbeuren (DE); Martin Lang, Wessobrunn (DE); Lionel Carre, Seeg (DE)

(73) Assignee: Pro-micron GmbH & Co. KG, Kaufberen (DE)

( * ) Notice: Subject to any disclaimer, the term of this patent is extended or adjusted under 35 U.S.C. 154(b) by 413 days.

(21) Appl. No.: 14/645,004

(22) Filed: Mar. 11, 2015

(65) Prior Publication Data

US 2015/0261207 A1 Sep. 17, 2015

(30) Foreign Application Priority Data

Mar. 11, 2014 (DE) .................. 10 2014 103 240

(51) Int. Cl.
*G05B 19/4065* (2006.01)
*B23Q 17/09* (2006.01)

(52) U.S. Cl.
CPC ..... *G05B 19/4065* (2013.01); *B23Q 17/0966* (2013.01); *G05B 2219/37228* (2013.01); *G05B 2219/37232* (2013.01); *G05B 2219/37239* (2013.01); *G05B 2219/37242* (2013.01)

(58) Field of Classification Search
CPC ...... G05B 19/4065; G05B 2219/37242; G05B 2219/37239; G05B 2219/37232; G05B 2219/37228
See application file for complete search history.

(56) References Cited

U.S. PATENT DOCUMENTS

| 4,555,955 | A | 12/1985 | Morgan et al. |
| 4,713,770 | A | 12/1987 | Hayes et al. |
| 7,289,873 | B2 | 10/2007 | Redecker et al. |
| 8,113,066 | B2 | 2/2012 | Eckstein et al. |

FOREIGN PATENT DOCUMENTS

| CH | 705388 B1 | 2/2013 |
| DE | 3307615 C2 | 9/1983 |
| DE | 225086 B1 | 7/1985 |
| DE | 3637128 A1 | 5/1988 |
| DE | 9014037 U1 | 12/1990 |
| DE | 4208701 C2 | 9/1993 |

(Continued)

*Primary Examiner* — Carlos Ortiz Rodriguez
(74) *Attorney, Agent, or Firm* — Sand & Sebolt

(57) ABSTRACT

A method for setting or monitoring operating parameters of a workpiece processing machine having a tool holder and means for moving a workpiece and the holder relative to one another along a first axis. During milling of the holder fitted with a workpiece and during application of the tool to a workpiece, values for at least one measured variable are registered and recorded. The variables include an axial force acting in a direction parallel to the first axis, a torque relative to the first axis or to an axis oriented parallel to the first axis, and bending torques or bending torque components according to direction and amount. The values are used to set the operating parameters with respect to an extended service life of the tool in conjunction with a processing time falling below a maximum machining time, monitoring tool wear or a machine error.

29 Claims, 3 Drawing Sheets

Biegemoment in x-Richtung [Nm]

(56) References Cited

FOREIGN PATENT DOCUMENTS

| | | |
|---|---:|---|
| DE | 4229569 C1 | 2/1994 |
| DE | 19643383 A1 | 5/1998 |
| DE | 19917626 A1 | 10/2000 |
| DE | 102007048961 A1 | 4/2009 |
| DE | 102008064391 | 7/2009 |
| DE | 202012103219 U1 | 1/2014 |
| EP | 1025952 A1 | 8/2000 |
| EP | 0901881 A2 | 10/2001 |
| EP | 1329289 B1 | 7/2003 |
| EP | 2048556 B1 | 4/2009 |
| WO | 2008142386 | 11/2008 |

METHOD FOR SETTING AND/OR MONITORING OPERATING PARAMETERS OF A WORKPIECE PROCESSING MACHINE

The invention relates to a method for setting and/or monitoring operating parameters of a workpiece processing machine.

In modern manufacturing methods, workpiece processing machines are initially set for processing a workpiece using a specific machining step, in particular for serial production, and, once successfully set in the processing sequence adjusted with respect to the operating parameters, are continuously used recurrently for machining a plurality of workpieces of the production series, which are identical and to be treated identically, using the installed machining step. This also applies to machining workpiece processing machines, in particular, for which the present invention, in particular, is intended. These include, in particular, machines, which carry out drilling and milling of a workpiece, in the case of milling, both a deep milling as well as a linear and surface milling or the like. However, turning machines also fall under this category of cutting workpiece processing machines.

In the event a new process is to be instituted for such processing machines, in order, for example, to incorporate a processing machine into the production of a particular part for the first time, the machine is then first set with respect to the operating parameters, which, in addition to selecting a suitable workpiece, involves, in particular, setting the parameters of the adjustable machine values and parameters such as, for example, rotational speed of a rotating tool holder, in which a selected tool is non-rotatably held, and feed rates of the tool relative to the workpiece in the possible working directions, for example, in an axial direction in relation to the rotational axis of the rotatably driven tool holder, or also in directions perpendicular to this axis. In turning machines, these parameters, in addition to the selection of the tool per se, are primarily the speed of the tool spindle and feed rate between tool and workpiece. The corresponding parameters are naturally specified in accordance with the requirements set by the machining step to be carried out, for example, the predetermined shape, i.e., based, for example, on the shape and the path of a milling track to be introduced, or else the orientation and depth of a bore to be added, or the shape of the surface produced by turning. At the same time, however, additional details and marginal conditions are taken into consideration in conjunction with a corresponding parameter setting, such as the machining time and, thus, the through-put of the processing machine, but also the avoidance of excessively high stresses of the material of the workpiece, which may result, for example, from excessively rapid feed rates during a machining. The corresponding parameter setting and setting of the workpiece processing machines are currently left primarily to the experience and the technical capability of an appropriate machine operator, who undertakes the corresponding setting and parameter setting based on his/her appropriate knowledge, on general manufacturer specifications of the tool used, and with the aid of trial start-ups.

In addition, when initially setting up a machining process on a workpiece processing machine, the tool wear is also regularly observed, in order, in particular, to define cycles within which tools must be replaced. Namely, tools, such as, for example, drills, turning or milling tools, worn beyond a certain point, result on the one hand in diminished machining results with respect to machining precision, but on the other hand also cause a potential total loss of the expensive tool if, for example, milling cutters are excessively worn beyond a point at which a re-sharpening of the corresponding milling tool would have been possible. In this context, series of tests with machining cycles and a sample tool are typically performed nowadays when setting corresponding workpiece processing machines, and the wear of the sample tool after machining a predefined number of workpieces is observed, typically by visual examination, for example, under a microscope, in part by measuring the cutting edge geometry altered by the wear. Based on these wear observations, projections of the permissible through-puts with a tool are made, before the latter is worn beyond an acceptable point, and thus the service life of a tool acceptable for this machining process, before the tool must be replaced, is defined.

However, it is also desirable as part of the production sequences, carried out after setting the processing machine for a serial production, to maintain the machining process and the operating parameters of the workpiece processing machine under observation, at least using random status analyses. In such case, it is of particular interest to track to what extent the machining process set up with regard to the operating parameters continues to operate in a stable manner, to what extent with respect to the machining result it leads to an output of consistently machined, and, with respect to the tolerances and machining qualities, identical, workpieces. At the same time, it is also of interest, in conjunction with such an observation, to determine, whether or not a tool is possibly prematurely worn or else even damaged in spite of the predefined service life (for example, a broken cutter in a milling or turning tool or the like). It is also desirable, in principle, to determine any anomalies during the operation of the processing machines such as, for example, changes to the machine itself (for example, worn-out bearings, increase in an undesired lateral play in linear guides or the like). Finally, it is also of interest to detect potentially occurring errors in the machining process such as, for example, an accumulation of shaving resulting from jammed borings in a drill or the like, since such occurrences may also negatively affect the machining process and, in addition, may also represent a hazard to the valuable tool.

For some of the above mentioned observations, the motor currents of drive motors, for example, of a drive motor for the rotary drive of the tool holder or of a workpiece holder (for example, a rotary spindle) are frequently monitored in processing machines currently in use, and, based on corresponding power consumption, conclusions are drawn about torques or other occurring forces. If, in such case, the motor current increases unexpectedly and in a manner deviating from the norm, then problems are suspected which require closer analysis. The problem with this approach, however, is the comparatively undifferentiated information derived from the mere monitoring of the motor current. Based on a corresponding increase of motor current, the machine operator is not yet able to deduce the specific cause of the phenomenon, generally a detailed study of the current condition of the processing machine and the parameter setting is required, which results in downtimes and, thus, financial losses. In addition, the measurement of motor current in small tools and/or of low machining forces is too imprecise. Bending torques occurring on the tool cannot even be registered via motor currents.

A workpiece processing machine, in this case with a rotary drivable tool, for which the invention may also be advantageously used, is, however, also a friction stir welding machine. With this machine as well, the parameters must be set for a corresponding production, in particular, a serial production, and it is desirable to monitor the process at least randomly during operation, in order to ensure a consistent quality of the weld seam produced with this device and machine. Similar questions arise here in conjunction with the setting, namely, a parameter setting of the machine for the corresponding machining process according to the specifications of an optimally rapid machining (a high throughput), on the one hand, but with corresponding protection of the workpieces and, where possible, the tool on the other hand.

Similarly, the invention may also be used in a friction welding machine, wherein here an additional element to be added to a workpiece with the aid of the friction welding process, for example, a weld-on bolt, is considered a "tool", which is rotary driven. In this case, therefore, the tool holder, as it is contained in the workpiece processing machine according to the invention, is to be understood as a rotary drivable spindle, which accommodates an element to be welded, for example, a bolt to be welded on in the friction welding process.

As portrayed above, the problem existing in the prior art is that during both the setting and the monitoring of the corresponding operating parameters of a workpiece processing machine having a tool holder, it is possible to make, at best, indirect statements about the forces and moments occurring, given the corresponding parameter setting, such that previously, given the corresponding setting and/or monitoring, it was largely the corresponding experience of the machine operator that was exclusively drawn upon, who was able to make use of appropriate means such as, for example, the measurement and monitoring of the power consumption of the drive motors. The result of this is, in particular, that in setting the operating parameters, frequently the optimum of a corresponding parameter setting with respect to various marginal conditions such as, in particular, careful machining of the workpiece, long intervention times and, therefore, short machining times and protection of the tool, has not been or cannot be achieved. So, too, the known methods are still comparatively imprecise with respect to the precision of the monitoring of the operating parameters, for example, with respect to a tool wear, or the detection of certain errors and anomalies in the machining process. This problem exists, in particular, at least in the case of tool holders that are rotationally drivable about a rotational axis, since in these cases, a monitoring of measuring values registered using corresponding measuring transducers or measuring sensors is frequently problematic.

Thus, the object of the present invention is to specify an approach here, which enables a more precise analysis of the operating states for an improved setting of the workpiece processing machine and its operating parameters with respect to an optimum operation, and which shows a more precise and better monitoring of the machining process, for example, with respect to a state of the tool or also with respect to the detection of particular anomalies or malfunctions, or changes in the system of the workpiece processing machine and of the tool utilized.

This object is achieved according to the invention by a method for setting and/or monitoring operating parameters of a workpiece processing machine having the features of a tool holder and means for moving a workpiece and the tool holder relative to one another, at least along a first axis, wherein, during the processing operation of the tool holder fitted with a workpiece, and during application of the tool to a workpiece, values for at least one of the following measured variables occurring on the tool during interaction between the tool and the workpiece and transmitted to the tool holder are detected, and are recorded for the machining sequence as being a. an axial force acting in a direction parallel to the first axis, b. a torque present relative to the first axis or to an axis oriented parallel to the first axis, and c. bending torques or bending torque components according to direction and amount, wherein the ascertained values for the at least one measured variable are used, in order to set, in a coordinated manner, the operating parameters with respect to an extended service life of the tool used, at the same time in conjunction with a processing time falling below a maximum machining time, and/or to monitor the processing operation with respect to a reproducibility of the same, and/or in order to monitor a tool wear and/or a machine error of the workpiece processing machine. Advantageous refinements of the method according to the invention include that the tool holder is rotationally drivable about the first axis or an axis of rotation parallel to the first axis, wherein the torque given on the rotational axis is registered, provided values for the measured variable b. are registered. The method further is characterized in that at least the value amounts and the directions for the measured variables of the bending torques and/or bending torque components in a plane situated perpendicular to the first axis, fixed relative to the tool holder, in the case of a rotating tool holder, rotating simultaneously with the latter, in a coordinate system fixed relative to the tool holder are registered, and that, for the evaluation, a plurality of values of the bending torques or bending torque moments, each registered at a predefined measuring point in time t, are plotted in a two-dimensional coordinate diagram. The value amounts and directions for the measured variables of the bending torques and/or bending torque components in two directions, an x-direction and a y-direction oriented perpendicular to one another in a plane perpendicular to the first axis, fixed relative to the tool holder, in the case of the rotating tool holder, simultaneously rotating with the latter, fixedly determined relative to the tool holder are registered, and that for the evaluation, a plurality of value pairs formed from values of bending torques or bending torque components, each registered at a predefined measuring point in time t in the x-direction and in the y-direction, are plotted as depicting points in a two-dimensional, rectangular coordinate diagram with the values in the x-direction along a first coordinate axis and the values in the y-direction along a second coordinate axis. The method is further characterized in that representation in the coordinate diagram is done for the value pairs lying within a time interval $\Delta t_1$, recorded at a rate of sampling, the interval between said samplings being significantly lower than the time interval $\Delta t_1$, in that after the end of the time interval $\Delta t_1$, values pairs lying within further time interval $\Delta t_2$, recorded at a sample rate which is significantly lower than the time interval $\Delta t_2$, are further represented in a new coordinate system, and that the successive representations are compared for analyzing a dynamic development of operating conditions, in particular of the tool status. In conjunction with a rotating tool holder, loads on individual peripheral sections of a tool disposed in the tool holder, rotationally driven about the rotation axis, are read from the representations in the coordinate system. The method is further characterized in that, when setting the machining process, an adjustment of the operating mode is made based on the representation in the coordinate diagram, in which the loads readable from the representation in the coordinate diagram on the individual peripheral sections of the rotating tool are reduced as a result of changes to the operating parameters. When monitoring the machining process, changes of the loads acting on the individual peripheral sections are observed and a wear of the tool is derived therefrom, wherein an alert for changing the tool is issued upon reaching a critical wear. The method is further characterized in that an anomaly in the machining process is deduced from representations of the measuring points in the coordinate diagram deviating, in particular deviating unsymmetrically, from the expected image of the representation. A vector sum is formed from bending torques and/or bending torque components occurring at a predefined point in time ascertained according to c. and, for the evaluation of the amount of this vector sum, is plotted as a function of time. The method is further characterized in that for monitoring the operating parameters of the processing machine, a comparison is made with values recorded for corresponding recorded reference processes and in a coordinate diagram or as a representation of the vector sum as a function of time, based on the representations of values recorded in the coordinate system during the machining process and/or in the plotting of the vector sum as a function of time. Evasive movements and/or deformations of the tool at the position of machining sections are computationally deduced from the recorded values of the measured variable(s) and from a geometry known per se, as well as from the material properties of the tool known per se, and further from a known positioning of the tool in the tool holder, in order in this way to check a machining process for dimensional deviations arising as a result of tool deformations. Ascertained evasive movements and/or deformations of the tool at the positions of the machining sections are used as a control variable for readjusting the relative position between tool and workpiece, in order in this way to maintain the sizing accuracy of the machining. The method further is characterized in that at least the values for which the bending torques are determined according to the amount and/or direction, and, with respect to a limit bending torque defined as maximally permissible in amount and/or direction, are compared. When monitoring the machining tool, the limit bending torque is defined as one which occurs in conjunction with a maximally permissible worn tool.

The method according to the invention for setting and/or monitoring operating parameters of a workpiece processing machine relates first of all to a workpiece processing machine, which includes a tool holder, as well as means for moving a workpiece and the tool holder relative to one another, at least in the direction of a first axis. In this case, the aforementioned means may mean that the tool holder is movable linearly in one direction parallel to the first axis, in which the workpiece is fixed in this direction. Equally, however, these means may also be implemented in such a way that the tool holder is correspondingly stationary relative to the processing machine, and a workpiece holder with the workpiece accommodated therein is movable in this direction relative to the tool holder, or also a combination of these two possibilities, in which both elements, tool holder and workpiece, are actively moved.

In the method according to the invention, values for at least one of the following measured variables occurring on the tool and transmitted to the tool holder during the interaction between the tool and the workpiece are recorded and charted for the machining sequence during the machining operation of the tool holder fitted with a tool and when the tool is engaged on a workpiece:
a. an axial force acting in a direction parallel to the first axis,
b. a torque present relative to the first axis or to an axis oriented parallel to the first axis,
c. bending torques or bending torque components according to direction and amount.

The values in this case are registered, in particular, by corresponding measuring sensors on the tool holder, for example, strain gauges, DMS or else SAW sensors or the like. In this case, a tool mounting equipped with corresponding measuring sensors or a tool holder of the processing machine itself, but also a spacer inserted in a tool mounting of the workpiece processing machine, which is clamped in the tool mounting of the processing machine, and which in turn has a tool mount for non-rotatably and fixedly immobilizing the tool, the actual tool holder, may serve as a tool holder. The tool holder may, in particular, also be formed to be rotationally drivable about a rotation axis parallel to or coinciding with the first axis. Such a spacer is then connected to the tool mounting of the processing machine rotationally fixed in relation to the rotation axis, and is correspondingly driven in a rotating manner. In other words, the tool holder to be provided according to the invention may also be implemented by an element designed as an adapter piece, such an adapter piece then including, in particular, the measuring sensors of the type described above.

If the tool holder, as this is provided in a possible refinement, is rotationally drivable about a rotation axis, this axis is situated parallel to the first axis and—if taken into consideration—as a measured variable according to point b. in the foregoing enumeration, is viewed as the torque present relative to the rotational axis.

According to the invention, the values determined for the at least one measured variable are used for setting the operating parameters in a coordinated manner with respect to an extended service life of the tool used, at the same time in conjunction with a processing time falling below a maximum machining time, and/or in order to monitor the machining process with respect to a reproducibility of the same and/or a tool wear and/or a machine error of the workpiece processing machine.

Thus, the method according to the invention provides that forces and/or torques occurring on the tool holder itself, as a result of a corresponding reaction force of the tool during a machining of the workpiece, are measured and used for an evaluation and, based thereon, a setting and/or monitoring of the operating parameters of the workpiece processing machine for a machining process. The data thus obtained may also be used in setting the operating parameters, in particular, to shorten the machining time by deducing from an acting axial force and/or a present torque and/or the registered bending torques or bending torque components at any point in time during the machining process, an engagement on the workpiece of the tool machining the workpiece, for example, during a trial run in conjunction with a setting procedure for setting the processing machine. Thus, in the case of a milling tool, for example, it may be detected when and, optionally, to what degree a milling cutter engages with the workpiece in a material-removing manner, since at this point in time a higher torque will be observable, or a corresponding axial reaction force in the case of an advance between tool holder and workpiece in the axial direction of the tool holder, or in the case of an advance between the tool holder and workpiece in a direction transverse to this axial direction, corresponding proportions of bending torques, which become noticeable in a direction transverse to the longitudinal axis and also to the rotation axis of the tool. Thus, a corresponding optimization may take place here to the extent that parameters of the machining process are set in such a way that maximally long periods of a predefined corresponding stress (occurrence of higher torques, occurrence of a bending torques exceeding a threshold or occurrence bending torques exceeding a minimum value) are ascertained. In this case, it is possible to include and take into consideration all of the aforementioned measured variables and their related values, independently of which specific tool or which workpiece processing machine is to be set here with the aid of the method according to the invention; however, it is possible to also consider just one or two the aforementioned measured variables.

In addition or alternatively, a corresponding approach, which is optimally gentle on the tool, may also be considered in conjunction with the setting. In corresponding machining processes, the tools used are often expensive, so that the service life of the tool is a not an inconsiderable cost factor. If a tool is inordinately stressed, its service life is reduced, so that it must be replaced sooner. The result on the one hand is that the tools become unusable sooner and must be replaced by a new tool, involving the correspondingly high procurement costs. On the other hand, this also results in shorter continuous running times of the processing machine, which must be halted at shorter intervals in order to change the tools. This is linked to drops in production, which also mean a financial loss. Even reconditioning measures, which must be taken in the event of potential further utilization of the tool, such as sharpening a milling tool at the milling blades or sharpening the cutting edges of a drill, are elaborate and entail costs, so that here, too, a longer service life of the tool and longer periods between such reconditioning measures to be taken are economically advantageous. Appropriate measures may be provided here with the method according to the invention by registering one, two or all of the measured variables mentioned under a. through c. above with respect to their values during a trial run-through of the machining process, and the values for these measured variables evaluated accordingly, in order, for example, to set a maximum force for the axial force, which points to a reduced tool load, for example, of a drill, or else, for example, in the case of a milling tool, to set the permissible torques and/or bending torques at a maximum value, and to set the parameters of the process accordingly so that the maximum values are not exceeded. This especially is a particular advantage of the method according to the invention, since a resolution of the observations and the recorded measured variables was impossible and, accordingly, a precise analysis of the stress on the tool used was previously impossible.

In the course of setting the machining process, the machine operator will seek a compromise between a tolerable tool load on the one hand and an economically required through-put, i.e., a high machining speed, on the other hand. He/she is able to carry out a superior corresponding method adjustment and process optimization having recourse to the measured variables a. through c., per the method according to the invention, to be measured individually, in combinations of two or all together and their recorded values. When setting the machining process, the machine operator may proceed repeatedly, for example, as follows:

First of all, once preset and operated in a trial run, he/she may evaluate a machining process, with respect to the recorded measured values in view of machining states declared as impermissible, i.e., with respect to machining steps, for example, in which at least once a value for at least one of the aforementioned measured variables exceeds a predefined maximum value, from which, for example, an inordinately high tool load may be deduced, but may also speak to an unacceptably high stress for the working piece to be machined and its material. In this case, the machine operator will first readjust his/her processing machine in such a way that, in a further trial run, such machining states defined as impermissible are no longer encountered. In a further stage, the machining process may then be further optimized within the permissible range by making a fine adjustment based on the particular measured values in further trial runs, to the extent that, on the one hand, a long overall period of the tool application (i.e., an optimization as described above with respect to the reaction forces and moments occurring during a tool application or tool engagement), and therefore a rapid machining time is maintained, which ensures a high machine through-put, on the other hand a tool stress is achieved that is uniform as possible and is within the predefined limits. In a further step, the machine operator may then optionally establish a guide time for the tool service life, based on the set parameters, according to which the machining tool in the processing machine must be replaced. In a further expanded stage, it is also possible to integrate an expert system, which at least partly relieves the machine operator of interpreting the measured values and, optionally, presents the operator with suggestions for process improvements.

However, even with respect to the monitoring of the machining process, which is carried out with the workpiece processing machine when setting the parameters, it is possible to advantageously use the method according to the invention, which provides the recording of measured values for at least one of the aforementioned measured variables. Thus, a corresponding process monitoring may take place, for example, by random repeated measurements of the measurements already carried out when setting the workpiece processing machine, in order, by comparing the measured values, to ascertain whether in this case operating parameters must be readjusted because the process has "wandered," for example, or whether a tool or equipment wear of the processing machine exists. This comparison may also be made relative to a "reference process" carried out in the course of setting, or afterwards, in which the parameter setting of the machine met the determined specifications and the result of the machining met the expectations and requirements.

In the method according to the invention, it is possible, in particular, by determining the bending torques, but also on the basis of the other measured values, to detect when changes or problems occur on the machine side such as, for example, worn-out bearings, play occurring in the linear guides or the like. Thus, in optionally rotationally drivable tool holders, as these are found in milling machines, drills, friction welding machines or friction stir welding machines, such phenomenon may become noticeable, for example, as a result of an imbalance in the tool rotation, which in turn—already and, in particular, without application to the workpiece—may be ascertained as a result of an asymmetry in the distribution of the bending torque across the rotation of the tool not observable under normal machine conditions. In this respect, for the method according to the invention, an observation of the aforementioned measured values, in particular of the torque about the rotation axis and/or the bending torques (see b. and c. above), can also be made, just in the case of a tool that is turning on or is freely rotating and without it being applied to the workpiece. However, it is also possible, via a correspondingly ascertained imbalance in the tool rotation, to detect an insufficiently balanced tool, a tool damaged along its periphery (for example, after a cutter breaks) or a clamped tool that is imprecisely aligned.

With regard to the registering of values for the measured variables of the bending torques or bending torque components, it is preferred, if the latter form the basis of the method according to the invention, in particular in the case of rotationally drivable tool holders, that these moments, resolved according to direction and amount, are measured in a plane perpendicular to the first axis, and then reproduced in a corresponding coordinate display and evaluated. This can occur, for example, by a recording according to amount and relative angle relative to a predefined reference direction, which is, in particular, fixed in relation to the (optionally rotating) tool holder. It is equally possible to carry out this measurement according to the directional components of the bending torques in two directions, oriented perpendicular to one another, in a (optionally simultaneously rotating) plane perpendicular to the rotation axis, fixedly correlated with a (optionally rotating) tool holder, fixedly determined relative to the tool holder, of which directions one may be understood as the "x-direction," a second as the "y-direction." For the evaluation then, a plurality of value pairs, in each case formed in the x-direction and in the y-direction from values of the bending torques or bending torque components recorded at a predefined measuring point in time t is plotted in a two-dimensional, rectangular coordinate diagram, in which the values recorded in the x-direction for the bending torques or bending torque components are plotted along a first coordinate axis, the values in the y-direction along a second coordinate axis, and the corresponding value pairs form depicting points in this coordinate diagram. In such a representation, a plurality of corresponding points appear in the coordinate diagram, which ultimately result in a type of point cloud or data cloud after a certain period of time has passed. Since the coordinate system, according to which the bending torques or bending torque components are registered with respect to their values, is stationary relative to the tool holder, an image correlated with the tool contour appears in the system, even if the direction of the bending torques occurring is also taken into consideration through a corresponding allocation of a sign (positive for a first direction and negative for the opposite direction). If, for example, a fixed, four-cutter milling tool is used in a rotating tool holder, then relatively high bending torques occur on the cutting edges when they are engaged with the workpiece, a correspondingly reduced bending torque when the falling edges skim past behind the cutting edges. This results in an image of the corresponding cutting edges as presently indicated in the representation described above, in this example, four in number. Depending on the stress on the tool, a corresponding "distortion" of this image results with a greater expansion and extension in the coordinate diagram in the case of higher bending torque stresses, and a correspondingly contracted or compressed display in the case of lower bending torque stresses. Moreover, in a typically symmetrically formed, selected tool, the image in such a representation is traditionally also symmetrical; it is possible to draw conclusions from asymmetries occurring, for example, as to uneven wear of the tool cutters, a broken cutter, a clamping of the tool which is potentially not exactly straight, and the like.

To be able to track a development or dynamic of the measured values over time in a representation as identified above, the representation in the coordinate diagram is advantageously implemented by doing the representation in the coordinate diagram for the value pairs lying within a time interval $\Delta t1$, recorded at a rate of sampling, the interval between said samplings being significantly lower than the time interval $\Delta t_1$, in that after the end of the time interval $\Delta t_1$, values pairs lying within further time interval $\Delta t_2$, recorded at a sample rate which is significantly lower than the time interval $\Delta t_2$, are further represented in a new coordinate system, and that the successive representations are compared for analyzing a dynamic development of operating conditions, in particular of the tool status.

Accordingly, value pairs, which lie within a time interval $\Delta t_1$, are recorded at a rate of sampling, the interval between said samplings being significantly lower than the time interval $\Delta t_1$, and these value pairs are displayed in a depiction in the coordinate diagram. Rate of sampling in this case means the interval between two measurements, such that, i.e., within a time interval $\Delta t_1$, a sufficient number of measurements are recorded in order to incorporate a meaningful image in the coordinate diagram. The time interval $\Delta t_1$ in this case is advantageously selected so that, in this time interval, the machining is carried out with consistent parameter settings with respect to the parameters relevant for the load, thus, in particular, consistent feed rates and feed direction of the relative advance between tool and workpiece, as well as identical tool rotational speed in the case of rotationally driven tool holders. The rate of sampling in such case is selected taking into consideration the duration of the time interval $\Delta t_1$, such that an amount of data sufficient for a meaningful representation is recorded within this period. If this first representation is recorded after the end of the time interval $\Delta t_1$, then the measurements and value pairs therein are recorded in a new representation in another empty coordinate diagram for a second time interval $\Delta t_2$, this at a rate of sampling, the interval between said samplings being significantly lower than the time interval $\Delta t_2$. Here, too, the time interval $\Delta t_2$ is, in particular, one within which the machining takes place with consistent parameters settings of the processing machine, in particular, with the same parameter settings as in the time interval $\Delta t_1$. After recording this measured value for the representation, further representations may follow accordingly, so that a dynamic development of operating conditions may be deduced from a comparison of the successive representations, in this case, in particular, of the condition of the tool. If the representations change, i.e., for example, the bending torques increase, then this may imply a tool wear, for example, a milling tool becoming dull.

It is equally conceivable, however, to place the time interval $\Delta t_1$, during which the values are recorded and represented as described above, in a phase of the machining, in which the parameter setting of the process is deliberately dynamic, i.e., in which the speed of a rotatingly driven tool holder is modified, for example, is increased, in which the feed rate or the feed direction is modified. In such case, images of the bending torques are then created, which reflect this dynamic. It is also possible, based on an evaluation of such representations, for example, by comparison with an image, as it was recorded for the same process step in a reference process previously documented and carried out on the processing machine during the machining of an identical workpiece with the same tool, to deduce any errors or disruptions in a timely manner, for example, tool wear or a wear or defect in the processing machine.

However, this type of representation and evaluation may not only be used for tools in shaving-removing machining processes, but also for applications in friction stir welding or in pure friction welding, where, for example, a tool correspondingly provided with an outer contour, circular in cross-section, yields a correspondingly circular image in the representation obtained as described above, and deviations from the circular shape imply an undesired anomaly in the machining process, for example, a slanted, i.e., tilted setting of the element to be welded relative to the rotation axis, i.e., the "tool" within the understanding of the invention.

Similarly, loads on individual peripheral sections of a tool disposed in the tool holder, for example, driven in a rotating manner about the rotation axis, may be deduced from the representations in the coordinate diagram, or corresponding loads may be read from these representations.

As mentioned above, in the process of setting, it may happen that these registered loads are reduced, in order, for example, to maintain a tool stress as low as possible. It is equally possible, as also previously mentioned, to deduce from these loads and an observed increase of the same, a tool wear, wherein maximum loads may be defined, which are reached in the prescribed machining process, and when they are exceeded or when they are reached, a tool wear may be interpreted as maximally tolerable and a replacement of tools may be prescribed.

If, as discussed above, a representation deviating from the expected image is detected in the representation of the measured points in the coordinate diagram, if this deviates, in particular, unsymmetrically, it is possible to advantageously deduce an anomaly in the machining process, which may be displayed visually to the equipment operator, a warning may be automatically triggered or it may simply be archived for purposes of documentation.

However, it is possible to evaluate the data ascertained for the bending torques not only by a directionally resolved plotting as described above, but also by plotting the amount of the vector sum resulting from all bending torques over time. In this case, the resulting vector prior to a sum formation, or the individual contributions prior to their vectorial addition, may also be projected on a plane oriented perpendicular to the first axis, in order, in this way to take into consideration only the resulting amount of the bending torque, which is active in the a direction perpendicular to the first axis. When viewed in this way, it is possible to detect unacceptably high bending torques which, for example, lie above a previously determined threshold limit, and which serve as evidence of an excessively high tool load during when setting the processing machine in accordance with the operating parameters, or also as an indicator of a tool wear exceeding an acceptable degree in the case of process-accompanying monitoring. Such an evaluation may, however, also indicate anomalies, which point to improper production sequences, for example, and thus, a machining result on the workpiece, which deviates from the specification.

During setting, however, it is possible to determine a minimum value for the amount of the vector sum of the bending torques, which indicates a tool application to the workpiece and, thus, an actual chip-removing machining, and which, if possible, is to be exceeded for a large time slice of the machining process. If, in this case, the directional components of the bending torque are also viewed in a representation as described further above, then, in the case of a milling tool, for example, this may also be viewed resolved to individual tool cutters or other peripheral machining sections of the tool, and the settings and parameters may be correspondingly adapted.

Within the scope of the present invention, it is, in particular, also possible and it defines the substance of an advantageous refinement, if evasive movements and/or deformations of the tool at a position of machining sections of the same may be computationally deduced from the registered values of the measured variable(s) and from a geometry known per se of the tool used, as well as from the material properties of the same known per se, and further from a known positioning of the tool in the tool holder, for example, in conjunction with the operating and control software of the processing machine. For this purpose, computational simulations, for example, may be used to draw conclusions about deformations or evasive movements of the tool, based on values measured with the measuring sensors for the forces and/or moments (torques and/or bending torques) acting on the tool, taking into consideration data relating to the tool geometry, the properties of the material of which the tool is made, as well as the exact clamping and positioning of the tool in the tool holder.

In this way, it is possible, for example, when setting a machining process, to take into consideration a corresponding movement and position change of the machining sections of the tool; for maintaining precision, it is possible to specify corresponding adjustment movements by the processing machine. It is also possible to track the maintenance of a tolerance limit during machining while monitoring the parameters. If, in this case, the ascertained values change, a warning may be displayed. However, the ascertained data on a position change of the machining sections of the tool may also be used as control data, in order to generate corresponding adjustment movements on site during an ongoing machining. This is advantageous, in particular, in the case of especially narrow tolerances as are required in tool construction. This approach is also significant, when, for example, tools provided with a long shaft and yet delicate, are used for machining deep cavities or fillets, which tools react with correspondingly greater sensitivity to operating transverse forces, and tend to evasive movements, all the more so if, for example, cutters of cutting tools become dull and in the course of this, the machining creates higher forces.

If the values for the axial force are determined, these may then be advantageously compared with respect to a limit axial force defined as maximally permissible. In this case, for example, the limit force may be defined when monitoring the machining process during ongoing operation (whether continuously or randomly), as one which occurs in conjunction with a maximally permissible worn tool. If this limit force is reached or even exceeded, then this may be taken in the process sequence according to the invention as a trigger for a tool replacement. When setting the machining process, the limit force may be defined in such a way that it indicates a maximally permissible tool stress, so that, for the setting step, this limit force should not be exceeded. At the same time, however, a lower limit for the axial force may also be determined, above which the axial force occurring in conjunction with a setting of the machining process should preferably move, in order to ensure, for example, that the machining process is carried out at an economically reasonable machining speed and, therefore, with a corresponding through-put.

Similarly, it is possible in carrying out the method according to the invention, and may be useful within the scope of the invention, depending on the type of processing machine and the machining steps carried out with it, to determine at least the values for the torque, and to compare them with respect to a maximally permissible defined limit torque. Here, too, as part of a monitoring of the machining process (again, whether continuous or random), the limit torque may be defined as one which occurs in conjunction with a maximally permissible worn tool. In turn, it is possible to define the limit torque appropriate for the setting of the machining process as one which occurs in conjunction with a maximally permissible tool stressing. Here, too, it is again possible, in particular in conjunction with the setting of the machine processing, to determine a minimum torque, which is preferably permanent, or at least to be exceeded during lengthy portions of the process, in order to shorten the machining time and to increase the through-put of the processing machine.

In addition to an axial movement of the tool holder in relation to the workpiece as a result of corresponding movement options in the direction of the first axis, it may be provided that the processing machine also includes means, in order to be able to move the workpiece and the tool holder linearly relative to one another in at least one direction oriented perpendicular to the first axis. Specifically in such a case, the observation of the bending torques is of particular interest, since in a corresponding process, corresponding bending stresses of tool holder relative to a workpiece arise in a direction transverse to the rotation axis. This is the case, for example, in milling, in part in turning, but also in friction stir welding. Here, too, it should again be noted that the aforementioned means may provide either an active movement of the tool holder relative to the still stationary workpiece, an active movement of the workpiece relative to the tool holder, or a combination of these movements.

In the method according to the invention, the registering of the values for the at least one measured variable advantageously includes a transmission of the values from a sensor to an evaluation unit, wherein this transmission is wireless in at least one section. This is of particular relevance and particularly advantageous if the tool holder is rotationally drivable. Namely, a wired transmission of measured values recorded on a rotationally moving tool holder to a stationary unit at which the evaluation takes place, cannot be implemented, or implemented only at great expense. For a corresponding recording of the measured values, a measuring system, in particular, may be used as is described in U.S. Pat. No. 8,113,066 B2. The measuring system shown there, which is designed as a clamp adapter for a tool holder of a processing machine having an attachment for clamping in the tool holder of the processing machine, and a tool holder and a sensor array disposed therebetween, is excellently suited for carrying out the method according to the invention, since it is able to define the measured values to be provided as a basis, and to record the corresponding values for these.

Once again, it should be clearly noted here that, though each of the preceding measured variables identified by the bullets a. through c. or their values may be taken as the basis for assessing the machining process, in particular, a combination of measured values of two or even all three of the measured values leads to particularly valid results, wherein a greater reliability and accuracy of the conclusions may be achieved, based also on a verification of a defined status of one of the measured variables or the associated measured values over the measured values of a second of the measured variables.

It is also possible to incorporate additional parameters in the status analysis and as a basis for setting and/or monitoring the workpiece processing machine, for example, a reasonable tool temperature or workpiece temperature. Thus, for example, conclusions may also be drawn, with regard to a temperature increase on the tool, about an impermissibly high stressing of a tool (for example, when setting the process) or about an advanced wear of the tool. In this case, it is possible, for example, and it is the basis of an advantageous refinement of the invention, when the tool temperature is registered with the aid of at least one temperature sensor on the tool holder and/or of a tool held in this tool holder, and correlated with the recorded values for the measured variable(s). The permissible load of a tool is namely also dependent on, among other things, its temperature. In the case of temperatures exceeding a critical threshold, the load capacity generally decreases. In this way, the temperature values may already be taken into consideration when setting the processing machine. However, they may also be incorporated in the assessment in conjunction with a later process monitoring, thus permitting an adaptation of the operating parameters while also taking these aspects into consideration.

It is also within the scope of the invention if, for monitoring the operating parameters, the ascertained values for the at least one measured variable and/or the evaluations derived therefrom of the adherence of previously defined limit values is archived for each machining cycle and stored in a machining protocol. In such case, an association may be made with machined workpieces as part of the machining sequences thus logged, in order in this way to be able to verify that the machining is proper and according to specifications. This may occur via a 1:1 association of a separately identified (for example, with a serial number) and individualized workpiece with the machining cycle, or also via batch-wise association of machining protocols with a workpiece batch. Such evidence is frequently required in modern manufacturing practice, for example, in the automotive supplier sector. Until now it has been possible to supply indirect data only in this regard, which indicated a proper program sequence on the processing machine. A significant improvement is achieved by associating real measured value protocols with at least one of the measured variables, but advantageously, in particular, the bending torques that become possible here.

If, as provided in another advantageous embodiment of the invention, it is provided that conclusions may be drawn regarding the actually occurring, standard clamping forces during the machining process, based on data typically available from the data sheets of the manufacturer or the supplier, in part even frequently supplied digitally, related to the geometry of the tool, to the material properties of the tool, to the geometry and the material properties of the workpiece, and—deducible from the setting of a digitally controlled processing machine—to the clamping and positioning of the tool in the tool holder, then a comparison may be made using the related information on a permissible load of the tool, which the manufacturer established and typically also supplies on the data sheets relating to the manufacturer's tool, in order in this way to be able to make a particularly accurate estimate of the operating parameters of the processing machine that are permissible, but are also favorable for a wear-free and with a high through-put, i.e., in the case of a cutting process, with a high cutting volume and, optionally, to readjust the parameters in conjunction with a setting of the machining sequence, or else as part of a monitoring in the ongoing production.

In order to detect periodically occurring phenomena, such as vibrations, in the system, the ascertained measured values may also be subjected in a subsequent analysis to corresponding transformation analyses, such as a LaPlace transform, a Fourier transform or a Fast-Fourier transform (FFT). Based on detected vibration behaviors, machine errors, in particular, may also be deduced in this case, since an impermissible "deviation" of the machine relative to the reaction forces, occurring and to be absorbed by the mechanics of the machine, and which may be traced back to bearing damage such as, for example, a bearing clearance in the rotary driven tool holder (for example, of a tool spindle), an excessively high lateral clearance in the linear guides, but also an excessively weak design of the machine, is frequently manifested in vibrational behavior. Vibrational states should also be avoided from the standpoint of careful handling of the tool, since, in the case of such vibrations, the tool is subjected to high force peaks and load peaks.

Based on the approach according to the invention, it is also possible when monitoring to draw conclusions about specific features of the workpiece from the observed values for the measured variables. Thus, sudden changes of the observed bending torques or torques during milling to the material homogeneity in the workpiece could be deduced. Thus, with the method according to the invention, it is even possible to detect production waste, which would be undetectable without expensive material testing (for example, X-ray analysis) of the workpieces. Similarly, it is possible to deduce inhomogeneities of the workpiece material from a sudden change of the axial force, but also a corresponding change of the bending torques and also of the torques during drilling.

This particular suitability of viewing bending torques as the basis for the assessment of machining processes per se, of the tool status, but also of the machine properties, is primarily also justified by the fact that deformations are initially detected with the DMS measuring sensors, SAW sensors or the like, provided in particular and attached to the tool holder, and based on these deformations, operating forces and torques are inferred. These deformations in the case of operative torques are, in particular, a function of the incorporated lever, i.e., the distance between a pivot point and the application point of the force involved. Whereas for a measurement of the torque, the lever (ultimately due to the comparatively small radius of the tools used) is quite small, a significantly larger lever, which will normally be greater by a factor of approximately 10, is achieved in such case as a result of the significantly longer shaft length of the tool, combined with the added length of the tool holder. However, variations in the deformations ascertained with the measuring sensors are then larger in a corresponding degree, which leads to higher measuring accuracy and measuring resolutions, thus, yields more reliable statements and conclusions even in the case of small changes.

Examples for the evaluation, according to the invention, of values recorded for the measured variables "bending torque" are found in the appended figures, on the basis of which exemplary approaches within the scope of the invention in conjunction with the setting and/or monitoring of the operating parameters of a processing machine are explained, in which.

Figure 1:
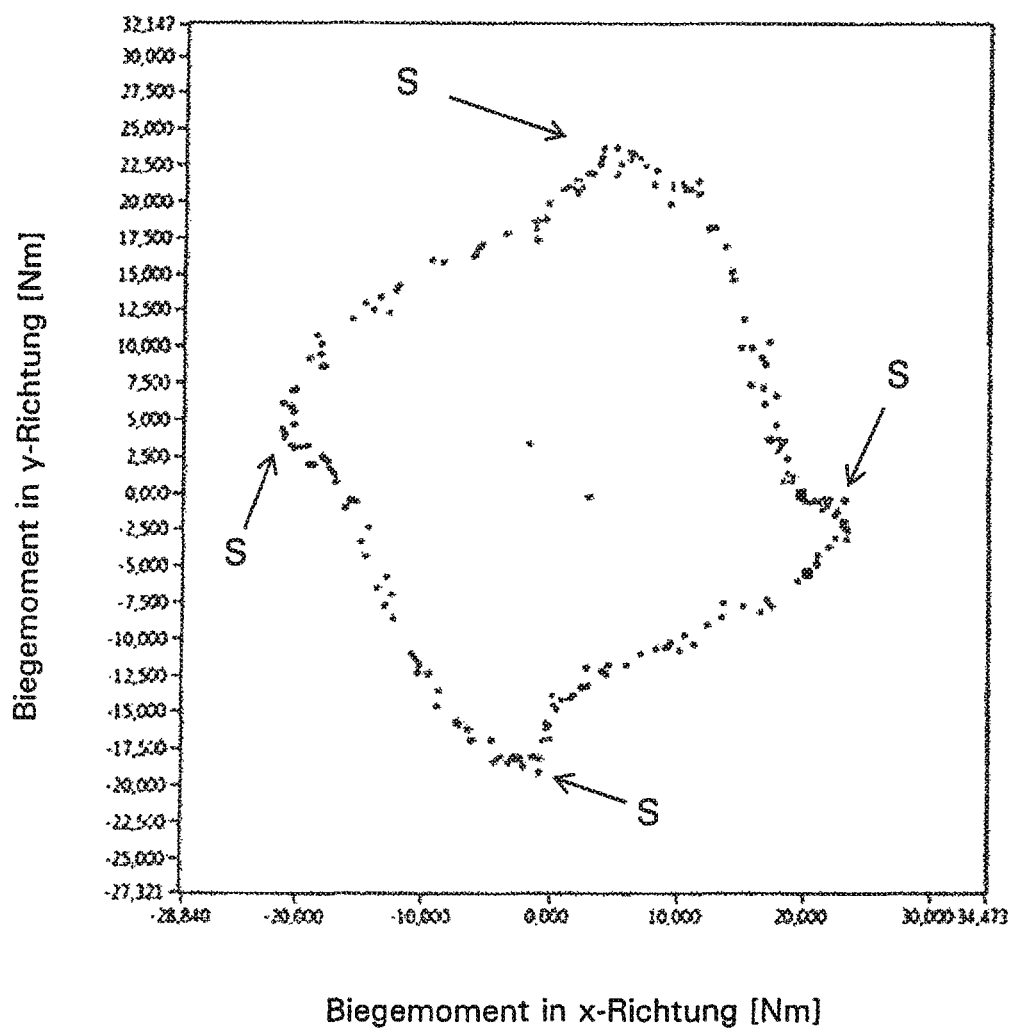
FIG. 1 shows a representation of measured bending torque values in a two dimensional coordinate diagram, resolved according to direction and amount of bending torque.

The enclosed FIG. 1 shows a representation of measured bending torque values, which show recorded value pairs of the x- and y-direction according to stationary coordinates oriented perpendicular to one another and in a plane oriented perpendicular to the rotation axis relative to the rotatable tool holder. The example shown depicts bending torques that were measured on a four-cutter milling tool during a machining operation and during a constant machining phase with respect to the parameter settings (tool speed, feed rate, feed direction). Easily recognizable are data points identified with the reference sign S, which depict the cutters of the milling tool. In this representation, each point of the data cloud stands for a value pair recorded at a point in time t, all totaled, a plurality of value pairs were recorded during a time interval $\Delta t_1$ in order to obtain the representation.

In this figure (FIG. 1), the values recorded and depicted are distributed along a level contour line over the time period $\Delta t_1$. This is specifically the result of the fact that within the time interval $\Delta t_1$, the operating parameters remained unchanged, i.e., for example, there was no change in the speed of the rotating tool, nor any changes in the feed rate and/or feed direction of the relative movement between the tool and the workpiece. Provided such changes occur during the time period $\Delta t_1$, other images result, from which other conclusions may be drawn about the dynamic development of the machining process. Even these images of the dynamic developmental processes, however, may be of interest and value for the evaluation, for example, as compared to images recorded during a reference process for an identical machining on the processing machine, in order in this way to be able to uncover deviations in the process and/or in the machine behavior in a timely manner.

From this representation, it is possible to derive information about the status and the load of the tool, as well as the progress of the machining process. In the representation shown, the figure obtained is symmetrical. If asymmetrical deviations were detectable here, this would imply an error in the machining process, for example, a broken cutter of the milling machine, if one of the milling cutters were no longer depicted.

Figure 2:
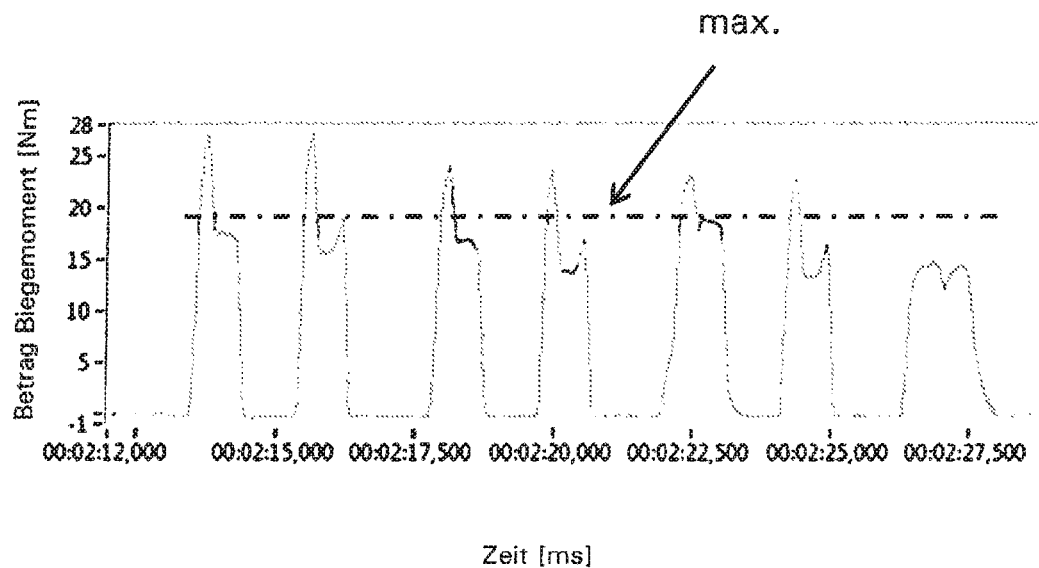
FIG. 2 shows another type of representation of measured bending torque values according to the amount of a vectorial formed sum of the given bending torques plotted over time.

FIG. 2 shows another type of representation and evaluation of the measured values for the given bending torques. Here, the amount of the vector sum of all bending torques applied at a particular point in time (i.e., the amount of a resulting bending torque) is plotted as a function of the period of time. Thus, from this representation it is possible to deduce the overall loads given at a particular point in time, which in this case operate perpendicular to the rotation axis. As indicated in the figure, a maximum value amount for the vectorial added bending torques, illustrated here by a dashed line identified with "max", may be established, in order, for example, to set the parameters in conjunction with the setting of the process on the processing machine in such a way that this value—even at the peaks depicted herein—is not exceeded. For this purpose, feed motions or displacement motions between the workpiece and the tool may be changed in such a way that these peaks are moderated and, in these regions as well, the amounts of the sums of the bending torques remain below the prescribed line of the limit amounts.

Figure 3:
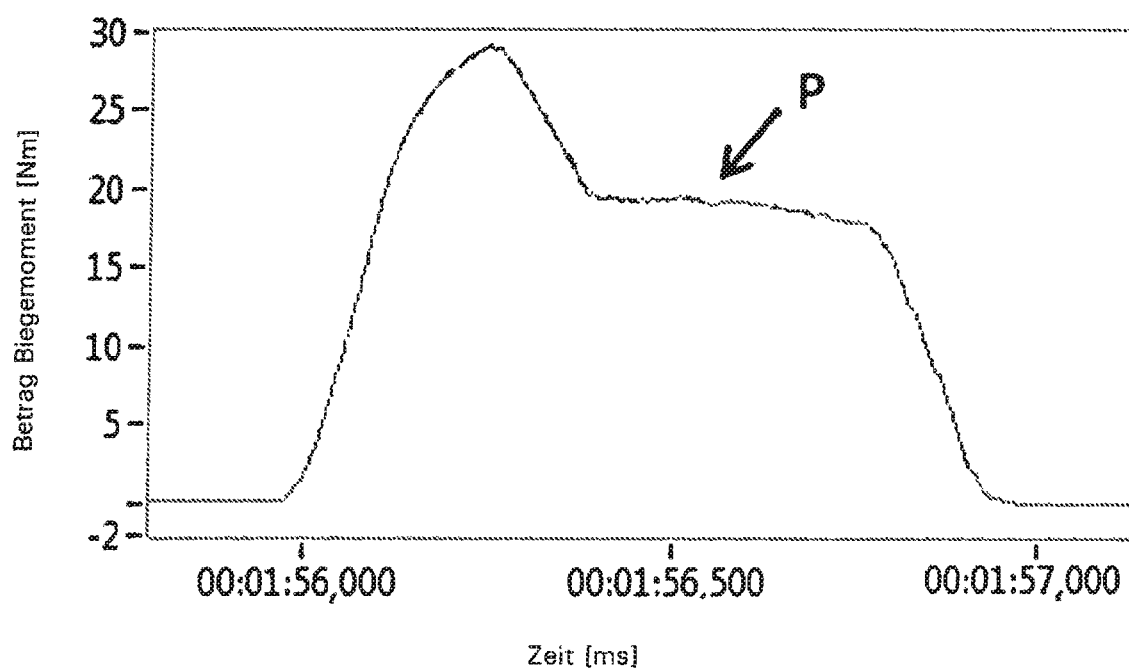
FIG. 3 shows a detailed view of a representation according to FIG. 2.

FIG. 3 shows a prominent representation of a curve of the amount of the vector sum of the bending torques given on the tool carrier, as it is also reproduced in FIG. 2. In this representation, a plateau identified by P is apparent, in which the amount of the vectorial sum of the bending torques affecting the tool holder is essentially constant. In such a time window, an evaluation and recording of the bending torques may advantageously take place, even in the direction as depicted in FIG. 1. There, namely, the ratios, for example, do not change due to the changing parameter specifications of the processing machine apparent in the flanks of the curve in FIG. 3, so that an image may be obtained as shown in FIG. 1.

Figure 4:
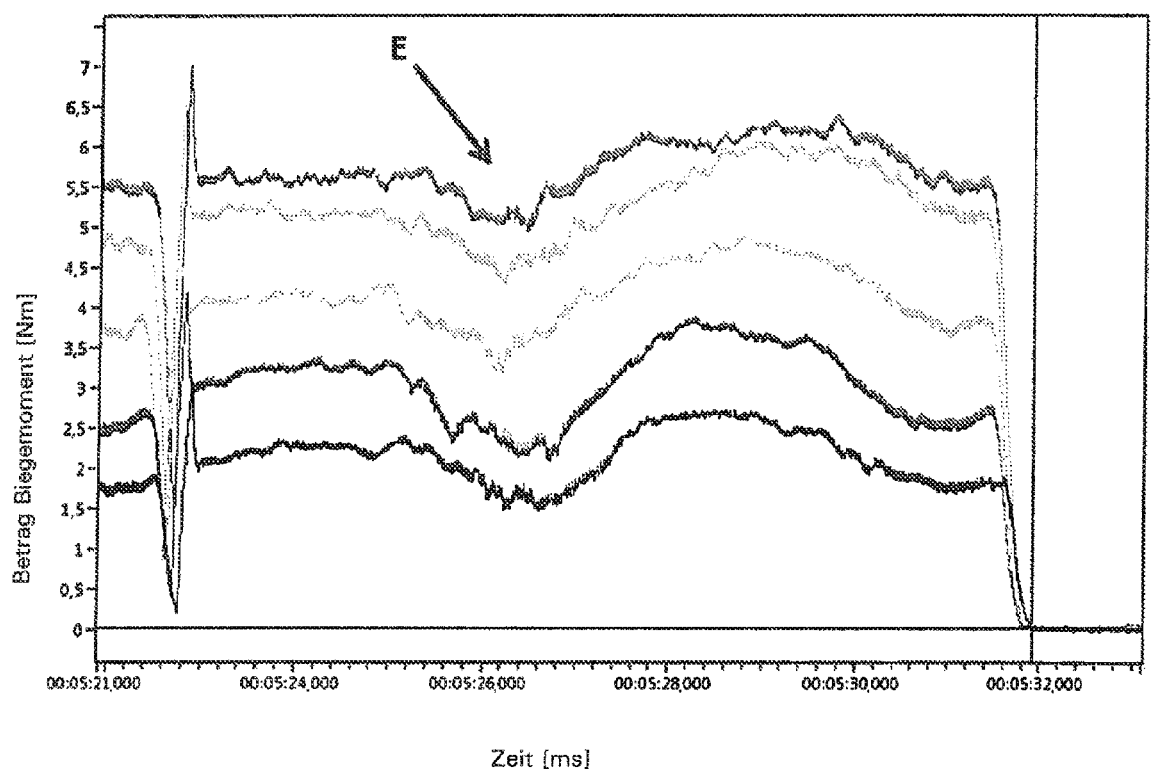
FIG. 4 shows a representation of the measured bending torque values according to the amount of a vectorial formed sum of the applied bending torques, plotted over time for an inner milling of a rounded segment in five successive in-depth machining steps, in this representation plotted one on top of the other.

FIG. 4 shows the curve of the value amount of the vector sum of the bending torques over time, as it was recorded during a milling carried out on a trial basis for introducing a recess with a circular inner contour in a workpiece. In the figure, the curves of a total of five milling operations in five successively started machining depths (z-direction) are shown—for the sake of better clarity, graduated in the y-direction (the direction of the plot of the amount of the bending torques). Steep curves having peaks breaking out downward and upward are shown to the left in the figure, which peaks characterize the engagement process. In the further course, the value amounts of the bending torque during a milling cycle are apparent. Easily apparent—at all machining depths—are drops in the amount of the vectorial sum of the bending torques, which are signified by the arrow identified by "E" These drops imply an error in the machining, since in conjunction with a precisely rounded machining, a uniform curve of the amount of bending torque would be expected. In this example, a milling resulted, which was not exactly round due to a flawed machine setting. The evaluation depicted could help to reveal this fact in a timely manner (in this case, already in conjunction with the setting of the processing machine for a series production).

The invention claimed is:

1. A method for setting or monitoring operating parameters of a workpiece processing machine, where the workpiece processing machine has a tool holder and means for moving a workpiece and the tool holder relative to one another at least along a first axis, wherein, during the processing operation of the tool holder fitted with a tool and during application of the tool to a workpiece, values for at least one of the following measured variables occurring on the tool during interaction between the tool and the workpiece and transmitted to the tool holder are ascertained, and are recorded for the machining sequence:
   a. an axial force acting in a direction parallel to the first axis,
   b. a torque present relative to the first axis or to an axis oriented parallel to the first axis,
   c. bending torques or bending torque components according to direction and amount,
   wherein the ascertained values for the at least one measured variable are used, in order to set, in a coordinated manner, the operating parameters with respect to an extended service life of the tool used, at the same time in conjunction with a processing time falling below a maximum machining time, or to monitor the processing operation with respect to a reproducibility of the processing operation, or in order to monitor a tool wear or a machine error of the workpiece processing machine.

2. The method according to claim 1, wherein the tool holder is rotationally drivable about the first axis or an axis of rotation parallel to the first axis, wherein the torque present on the rotational axis is registered, provided values for the measured variable b. are registered.

3. The method according to claim 1 wherein at least the value amounts and the directions for the measured variables of the bending torques or bending torque components in a plane situated perpendicular to the first axis, fixed relative to the tool holder, in the case of a rotating tool holder, rotating simultaneously with the tool holder, in a coordinate system fixed relative to the tool holder are registered, and that, for the evaluation, a plurality of values of the bending torques or bending torque moments, each registered at a predefined measuring point in time t, are plotted in a two-dimensional coordinate diagram.

4. The method according to claim 3, wherein the value amounts and directions for the measured variables of the bending torques or bending torque components in two directions, an x-direction and a y-direction oriented perpendicular to one another in a plane perpendicular to the first axis, fixed relative to the tool holder, in the case of the rotating tool holder, simultaneously rotating with the tool holder, fixedly determined relative to the tool holder are registered, and that for the evaluation a plurality of value pairs formed from values of bending torques or bending torque components, each registered at a predefined measuring point in time t in the x-direction and in the y-direction, are plotted as depicting points in a two-dimensional, rectangular coordinate diagram with the values in the x-direction along a first coordinate axis and the values in the y-direction along a second coordinate axis.

5. The method according to claim 3, wherein representation in the coordinate diagram is done for the value pairs lying within a time interval $\Delta t_1$, recorded at a rate of sampling, the interval between said samplings being significantly lower than the time interval $\Delta t_1$, in that after the end of the time interval $\Delta t_1$, values pairs lying within further time interval $\Delta t_2$, recorded at a sample rate which is significantly lower than the time interval $\Delta t_2$, are further represented in a new coordinate system, and that the successive representations are compared for analyzing a dynamic development of operating conditions.

6. The method according to claim 3 wherein in conjunction with a rotating tool holder, loads on individual peripheral sections of a tool disposed in the tool holder, rotationally driven about the rotation axis, are read from the representations in the coordinate system.

7. The method according to claim 6, wherein when setting the machining process, an adjustment of the operating mode is made based on the representation in the coordinate diagram, in which the loads readable from the representation in the coordinate diagram on the individual peripheral sections of the rotating tool are reduced as a result of changes to the operating parameters.

8. The method according to claim 6, wherein when monitoring the machining process, changes of the loads acting on the individual peripheral sections are observed and a wear of the tool is derived from the changes of the loads acting on the individual peripheral sections, wherein an alert for changing the tool is issued upon reaching a critical wear.

9. The method according to claim 3, wherein an anomaly in the machining process is deduced from representations of the measuring points in the coordinate diagram deviating from the expected image of the representation.

10. The method according to claim 1, wherein a vector sum is formed from bending torques or bending torque components occurring at a predefined point in time ascertained according to c. and, for the evaluation of the amount of this vector sum, is plotted as a function of time.

11. The method according to claim 3, wherein for monitoring the operating parameters of the processing machine, a comparison is made with values recorded for corresponding recorded reference processes and in a coordinate diagram or as a representation of the vector sum as a function of time, based on the representations of values recorded in the coordinate system during the machining process or in the plotting of the vector sum as a function of time.

12. The method according to claim 1, wherein evasive movements or deformations of the tool at the position of machining sections are computationally deduced from the recorded values of the measured variables and from a known geometry of the tool, as well as from the known material properties of the tool, and further from a known positioning of the tool in the tool holder, in order in this way to check a machining process for dimensional deviations arising as a result of tool deformations.

13. The method according to claim 12, wherein the ascertained evasive movements or deformations of the tool at the positions of the machining sections are used as a control variable for readjusting the relative position between tool and workpiece, in order in this way to maintain the sizing accuracy of the machining.

14. The method according to claim 1, wherein at least the values for which the bending torques are determined according to the amount or direction, and, with respect to a limit bending torque defined as maximally permissible in amount or direction, are compared.

15. The method according to claim 14, wherein when monitoring the machining tool, the limit bending torque is defined as a torque which occurs in conjunction with a maximally permissible worn tool.

16. The method according to claim 14, wherein when setting up the machining process, the limit bending torque is specified as a torque which occurs in conjunction with a maximally permissible tool stress.

17. The method according to claim 1, wherein at the least the values for the axial force are determined and compared with respect to a limit axial force defined as maximally permissible.

18. The method according to claim 17, wherein when monitoring the machining process, the limit force is specified as a force which occurs in conjunction with a maximally permissible worn tool.

19. The method according to claim 17, wherein when setting up the machining process, the limit force is specified as a force which occurs in conjunction with a maximally permissible tool stress.

20. The method according to claim 1, wherein at least the values for the torque are determined and compared with respect to a limit torque defined as maximally permissible.

21. The method according to claim 20, wherein when monitoring the machining process, the limit torque is specified as a torque which occurs in conjunction with a maximally permissible worn tool.

22. The method according to claim 20, wherein when setting up the machining process, the limit torque is specified as a torque which occurs in conjunction with a maximally permissible tool stress.

23. The method according to claim 1, wherein means are also provided in the processing machine for a relative movement between the tool holder and the workpiece in at least one direction oriented perpendicular to the rotation axis.

24. The method according to claim 1, wherein the registering of the values for the at least one measured variable includes transmitting the values from a measuring sensor to an evaluation unit, and that this transmission occurs wirelessly in at least in section.

25. The method according to claim 1, wherein a tool temperature is also registered by a temperature sensor on the tool holder or on the tool, wherein the registered temperature value is correlated with the recorded values for the ascertained measured variables, in order, in this way, to ascertain particularly suitable operating parameters for the operation of the processing machine, taking into consideration the temperature dependency of the permissible load of the tool used.

26. The method according to claim 1, wherein for monitoring the operating parameters for each machining process carried out on a workpiece, values for at least one of the measured variables are recorded and evaluated with respect to the adherence to previously specified permissible limits, and that the values or results of the evaluation are stored as processing protocol in correlation to the latter as the monitoring is carried out.

27. The method according claim 1, wherein for setting the operating parameters or for monitoring the operating parameters, standardized cutting forces actually occurring during the machining process are ascertained from the registered values for the at least one measured variable, using data on the geometry or material characteristics of a tool, as well as on the positioning of the tool in the tool holder, and further taking into consideration data on the geometry and material characteristics of a workpiece to be machined, and these cutting forces are compared with permissible or recommended values for the load of the tool specified by the manufacturer, in order, taking this comparison into consideration, to optimize the operating parameters with respect to the tool wear or cutting volume.

28. The method according to claim 5, wherein the successive representations are compared for analyzing the tool status.

29. The method according to claim 9, wherein the anomaly in the machining process is deduced from representations of the measuring points in the coordinate diagram deviating unsymmetrically from the expected image of the representation.

* * * * *